2,868,618

METHOD OF CONCENTRATING MINERAL VALUES

Fred N. Oberg, Lakeland, Fla., and Ira M. Le Baron, Evanston, Ill., assignors, by mesne assignments, to the United States of America as represented by the United States Atomic Energy Commission No Drawing. Application July 6, 1955
Serial No. 520,375

4 Claims. (Cl. 23—14.5)

This invention relates to the recovery of mineral values from Florida phosphate-bearing ores. More particularly, it relates to the beneficiation of uranium, aluminum and phosphate and minor values into efficiently processable concentrates. Still more particularly, it relates to the segregation of uranium-bearing materials from the Florida pebble phosphate field into relatively highly concentrated slurries.

Phosphate bearing ores are found in the Florida pebble phosphate fields in three distinct strata. Overlaying these strata is a sandy top cover which is removed by strip mining. Removal of the sandy overburden uncovers the leached zone layer varying from about 3 to about 14 feet in depth. This leached zone layer overlays a transition zone, which in turn overlays the true phosphate matrix. This economic phosphate matrix, varying from 10 to 20 feet in depth, has been the source of Florida pebble phosphate. The three strata differ markedly in their phosphate content, but all three contain materials in which there occur minor element values and uranium values ranging from about 0.007% to about 0.3% in the "as-mined" feed.

Apparently uranium occurs in different forms in the different layers. The leached zone layer contains predominantly acid insoluble quartz. The uranium values occur in the leached zone material predominantly in the small particle fraction of a size smaller than between about 150 mesh and about 220 mesh standard screen size. This small particle fraction contains roughly 70% of the valuable minerals to be found in the leached zone material.

Transition zone material consists predominantly of quartz, phosphate, clays and slimes. The clay-like phosphates present exhibit a porous and generally soft, pliable structure. Mineralogically, transition zone material consists of quartz, apatite, wavellite, pseudo-wavellite, and perhaps kaolinite as the major phases. Chemically, the clay-like material is considered to be a mixture of hydrated aluminum and calcium aluminum phosphate. Leached zone and transition zone materials show the following average composition, obtained by averaging a large number of core samples.

| Constituent | Analysis for ore fraction indicated (percent by weight) | | | | | |
|---|---|---|---|---|---|---|
| | Leached Zone | | | Transition Zone | | |
| | +14 mesh | −14+200 mesh | −200 mesh | +14 mesh | −14+200 mesh | −200 mesh |
| Al₂O₃ | 13.24 | 1.60 | 22.89 | 2.60 | 1.16 | 13.79 |
| P₂O₅ | 14.09 | 3.70 | 14.94 | 29.77 | 14.28 | 21.65 |
| U₃O₈ | 0.015 | 0.0034 | 0.029 | 0.022 | 0.0072 | 0.002 |
| CaO | 8.11 | 2.45 | 7.16 | 41.56 | 19.26 | 21.15 |
| Fe₂O₃ | 2.95 | 2.86 | 2.94 | 2.08 | 1.91 | 3.08 |
| Acid insolubles (sand etc.) | 55.22 | 93.43 | 41.11 | 11.36 | 58.12 | 28.43 |

Phosphate matrix generally speaking consists of phosphate pebble material or apatite (tricalcium phosphate), silica sand and clay, such as montmorillonite. Valuable mineral constituents in this matrix are different in character from the leached zone material and are recoverable as a fraction of a much larger particle size than that in which is found the major portion of the valuable minerals in leached zone material.

It is a primary object of this invention to obtain a maximum recovery of phosphatic values containing a minimum of slime material.

It is another object of this invention to efficiently recover mineral values of all three strata of the Florida pebble phosphate fields.

It is still another object of this invention to obtain aluminum and uranium and the like values in higher slurry concentrate forms than have heretofore been obtained.

These and other objects of the invention will be apparent to those skilled in the art from the following description.

In carrying out the process, leached zone material is classified to recover a fraction of −200 mesh size particles, transition zone material is similarly classified to recover a −200 mesh fraction and a +200 mesh fraction, phosphate matrix is simultaneously classified to recover a +200 mesh fraction, the +200 mesh fractions being combined for further processing to recover phosphate and the −200 mesh fractions being combined for further treatment for recovery of iron, aluminum, uranium and phosphate values.

In a preferred embodiment of the invention, leached zone material is slurried with water, attrition mixed at 50% to 70% solids, and screened to remove a plus 1 millimeter particle size fraction. To a slurry of the minus 1 millimeter fraction is added a dispersant, if said dispersant was not added to the initial slurry, and the mixture subjected to classification to recover a product smaller than about 150 to about 220 mesh size. Simultaneously, transition zone material is slurried and screened to separate a plus 1 millimeter size fraction and a fraction of minus 1 millimeter particle size. To a slurry of the minus 1 millimeter fraction is added the same dispersant as was added to leach zone slurry or a dispersant compatible with the previously used dispersant. The dispersed transition zone solids mixture is subjected to hydroclassification to recover a small particle size fraction of a size smaller than about 150 to about 220 mesh and a larger particle size fraction, i. e., plus 150 mesh size. The minus 150 mesh size fraction from leach zone and from transition zone are combined for processing to recover aluminum, phosphorus and uranium values.

At the same time phosphate matrix is separately slurried and screened to recover a minus 1 millimeter fraction. The plus 150 mesh fraction of transition zone material is mixed with the minus 1 millimeter fraction from the phosphate screening and the mixture classified to recover a phosphate feed for further processing, such as desliming, screening, flotation, tabling, spiralling or a combination of these treatments designed to separate phosphate material of at least 65% B. P. L. from gangue material.

More in detail, the process for recovering mineral values from matrices of the types found in the Florida area and using water as the liquid medium, transition zone material dug at the mine is slurried with water and pumped to a washer where all particles having a diameter of approximately plus 1 millimeter are removed. In general, this plus 1 millimeter fraction is known as Florida pebble phosphate. The remaining slurry which comprises essentially phosphate particles of various sizes, clay, silica, etc., is then passed into a separation or size fractionation using such as a hydroseparator.

In the normal hydro-separation of materials of the types discussed here, for example, leached zone material, the overflow or small particle size product has a solids content of between about 5% and about 8% by weight. In the normal hydroclassification of leached zone between about 4 and 8 pounds of water per pound of dry feed are added prior to the classification. Separation of material into about plus 200 and minus 200 mesh fractions requires a classification settling area of between about 10 and about 40 square feet per ton dry solids per hour. Under these conditions normally about 6 percent of from the hydroclassification of predominantly minus 200 mesh material. The underflow from the hydroclassification operation again is mixed with water for further desliming prior to subsequent discard or recoveries of a phosphate mineral concentrate such that about 94% of the minus 200 mesh material is removed. The overflow from the hydroclassification of predominantly minus 200 mesh material is about a 6% solids slurry, and normally is thickened to a solids concentration of between about 22% and about 32% solids. When this thickening is accomplished in conventional equipment, preferably operating in conjunction with pickets, a settling area of between about 80 and about 300 square feet, normally 140 square feet of settling area per ton of dry solids per 24 hours was required. A solids retention time of between about 50 hours and about 150 hours, normally about 80 hours, was required to obtain about 28% solids. This settling area, for thickening, can be decreased to between about 10 and about 100, normally about 35 square feet per ton dry solids per 24 hours by use of between about 0.5 and about 5 pounds per ton dry solids of additive such as hydrolyzed polymerized acrylonitrile, guartec, potato starch, caustic starch and the like.

Addition of disperant prior to or during hydroclassification permits an increase in the solids content of the overflow from a hydro-separation, using decreased quantities of water, of between about 0.4 and about 1.6 pounds water per pound of dry feed, to between about 25% and about 35% and at the same time improves the separation between, for example, +200 mesh size and —200 mesh size material.

When adding dispersants in the hydroclassification operation, and under conditions identical to those in the normal hydroclassification operation above, a classification settling area of between about 2 and about 10, normally about 5 square feet per ton dry solids per hour is required to effect a sizing at about 200 mesh. The overflow from the classification operation normally will contain less than about 2 percent entrainment of plus 200 mesh material. Subsequent further desliming of the classification underflow material, still having the influence of the dispersants as in the primary hydroclassification, will permit removal of better than 97% of the minus 200 mesh material from the plus 200 mesh fraction.

Agents useful as dispersants in this field are, for example, sodium silicate, sodium hexametaphosphate and the like. Agents such as sodium hexametaphosphate are added in quantities ranging from about 0.5 pound to about 9.0 pounds per ton of minus 1 millimeter solids, preferably about 3 pounds per ton. Sodium silicate is used in quantities between about 1 pound and about 30 pounds per ton of solids, preferably about 15 pounds per ton. Preparations will vary when the above agents are used in combination and/or when combined with small percentages of lime, fatty acid soap and the like.

During classification, when using dispersants, the temperature is generally maintained below 100° F. because the effectiveness of the dispersants falls off at higher temperatures. The overflow from the hydro-classification system is separated for further processing in combination with a corresponding particle size fraction obtained in the processing of leached zone material. A relatively large particle size fraction is withdrawn from the hydro-classification system for processing in conjunction with a corresponding particle size material segregated in processing of phosphate matrix. Reference is made herein to hydro-classification, but it is to be understood that in addition to such apparatus as Dorr bowl-rake classifiers, that the continuous Bird centrifuge, wet cyclones, and like equipment may be used to accomplish the size separation called for in this step of the process.

Pebble phosphate matrix dug at the mine is slurried with water and pumped to a washer where all particles having a diameter of approximately plus 1 millimeter are removed from the slurry for marketing as Florida pebble phosphate. The remaining slurry which comprises essentially phosphate particles, clay, silica, sand, etc., is then delivered into a separation or size fractionation system. The overflow from the size separation such as hydro-classification is withdrawn from the system. This low density fraction constitutes the slimes of the system and is made up chiefly of suspended clay and small particles of phosphate of sufficient degree of fineness that they could not be recovered at any subsequent step of the process, such as flotation. The relatively high density solids slurry or underflow from the hydro-classification, i. e., generally the +200 mesh size material is combined with the corresponding mesh size material from the transition zone processing and the two comprise the feed fraction to a sizing-beneficiation process which may involve any number of expedients, in general, tabling or froth flotation operations which are well known in the industry and are designed to free the phosphate of silica and minor amounts of gangue material in order to produce a final phosphate concentrate running as high as 77% to 78% bone phosphate of lime.

In order to improve the physical characteristics of the slurry, in general the products going to subsequent processing are not those directly discharged from the hydroclassifier. In the processing of phosphate matrix, the overflow material from the hydro-separator is discharged to waste. The underflow product from the hydro-separator is fed to, for example, Akins classifiers and the overflow material from the Akins classifier returned for combining with feed to the hydro-classifier, thus eliminating a further quantity of fine waste material. Underflow or large particle size material issuing from the Akins classifier is fed to a trommel or other suitable screening mechanism in general to produce a —14 +35 mesh size fraction and a —35 +200 mesh fraction, the former usually being the feed to a tabling or spiralling operation, while the latter is the feed to a flotation operation, such as a flotation effected with the aid of fuel oil, kesosene, fatty acid and caustic soda as the flotation reagents.

Leached zone material dug at the mine is slurried with water and pumped to a washer where all the particles having a diameter of approximately plus 1 millimeter are removed. This plus 1 millimeter fraction from the leached zone material, like the fine material recovered from the phosphate matrix, may be of such a character as to be a waste product. If the plus 1 millimeter fraction is determined by well known and analytical methods to have sufficient phosphate in it to warrant processing, the fraction may be treated in a manner similar to the plus 1 millimeter fraction recovered in processing of phosphate matrix. The plus 1 millimeter material is further processed through a trommel which separates mud balls as about plus 1½ inch material. This material is sent to a hammer mill for breaking up. The undersized material from the trommel generally is screened to make a separation between about plus ⅝ inch size material and about minus ⅝ inch size material. The plus ⅝ inch size material is likewise sent to a hammer mill. The minus ⅝ inch material is then washed and screened at about 1 millimeter. Oversize material from each of the separation steps above, plus ⅝ inch, are returned after passage through hammer mills to the feed to the screens where a separation is made between minus and plus 1 millimeter particle size fractions. Minus ⅝ inch, plus 1 millimeter, material constitutes a pebble phosphate concentrate.

The invention is further illustrated by the following examples, without any intention that the invention be limited to the specific details set forth.

Example I

Leached zone material was mined at a rate of 6.9 tons per hour dry solids plus 1.7 tons per hour contained moisture. These solids were dropped into a conventional suction pit where high pressure water was added at a rate of 57.4 gallons per minute and the resulting slurry pumped to an ore processing plant where about 0.345 ton per hour of plus ⅜ inch material was removed using a trommel. The oversize material was removed, mixed with sufficient water to make a 30% solids pulp and sent to a hammer mill where it was reduced to minus ⅜ inch and returned to the trommel. Minus ⅜ inch material was screened at 14 mesh on a vibrating screen to recover 0.358 ton per hour of minus ⅜ inch plus 14 mesh phosphate pebble. This was dryed and ground to about 50% minus 200 mesh and combined with minus 200 mesh material recovered at a later processing step after thickening of the hydroclassifier overflow.

Minus 14 mesh material from the screening operation was mixed with water and fed to a hydroseparator provided with a settling area of 113 square feet where a mesh split at about 200 mesh was effected. The overflow from the hydroclassification consisted of 2.160 tons per hour minus 200 mesh, 0.25 ton per hour plus 200 mesh and 43.7 tons per hour of water. This was thickened in a conventional thickener to 25% solids and this mixed with the ground plus 14 mesh fraction for subsequent feed to recovery of contained values in chemical circuits. The underflow from the classification operations was 4.75 tons per hour of plus 200 mesh, 0.95 ton per hour minus 200 mesh and 13.32 tons per hour water. This underflow was further deslimed and additional water of about 18.0 gallons per minute added while the underflow was processed in two bowl desilters operating in series, with a blade mill separating the two desilters. The overflows from the two desilters and blade mill were returned for introduction with fresh feed to the primary hydroseparator. The underflow of about 1.4 tons per hour water, 4.15 tons per hour minus 14 plus 200 mesh material and 0.12 ton per hour minus 200 mesh material was discarded.

Chemical analyses of the feed and the various fractions removed were as follows:

| Screen Size | Weight Percent (Dry Basis) | | | | | |
|---|---|---|---|---|---|---|
| | Weight | $Al_2O_3$ | CaO | $Fe_2O_3$ | Acid Insolubles | $P_2O_5$ | $U_3O_8$ |
| +14 mesh | 5.19 | 12.03 | 13.64 | 2.38 | 49.82 | 19.35 | 0.018 |
| −14, +200 mesh | 61.88 | 2.30 | 3.39 | 1.86 | 90.31 | 4.38 | 0.004 |
| −200 mesh | 33.12 | 26.98 | 7.91 | 2.79 | 40.39 | 16.11 | 0.029 |
| Feed | 100 | 10.98 | 5.42 | 2.20 | 71.67 | 9.04 | 0.013 |

Example II

Leached zone of composition identical to that used in Example I was mined at a rate of 6.9 tons per hour dry solids. This material was discharged to a conveyer belt, transported to an ore processing plant, and mixed with a slurry containing about 67 tons per hour water which had been recovered from washing of primary hydroseparator underflow at a later step in the process. Simultaneously with water addition was added 0.02 ton per hour of sodium hexametaphosphate, which is sold commercially under the trademark of Calgon, as a dispersant and this slurry passed through a trommel, and screening operation to recover a phosphate pebble product, and a minus 14 mesh product using equipment and the processing steps in Example I.

Minus 14 mesh material from the screening operation was fed to a hydroseparator provided with a settling area of 27 square feet where a mesh split at about 200 mesh was effected. The overflow from the hydroclassification consisted of 2.24 tons per hour minus 200 mesh, 0.09 ton per hour plus 200 mesh and 7.0 tons per hour of water. This slurry was used as subsequent feed to recovery of contained values in chemical circuits. Underflow from the classification operation was further deslimed and additional water of about 15.6 gallons per minute added while the underflow was processed as in Example I. The overflow from the bowl desilters and blade mill were returned for introduction with "as-mined" leached zone. Chemical composition of the products recovered in the various operations were substantially the same as those illustrated in Example I.

From a comparison of the solids and water content of overflow streams of Examples I and II, it is apparent that the use of a small amount of dispersant makes possible a manifold reduction in water requirements and the rapid production of a relatively concentrated slurry of minus 200 mesh size material.

Example III

In a strip mining operation in the Florida phosphate pebble area approximately 60 parts by weight per hour of leached zone, 30 parts by weight of transition zone and 180 parts by weight phosphate matrix were respectively separately recovered and transported to ore-processing plants. The ore-processing plants are termed plant A for leached zone, plant B for transition zone and plant C for phosphate matrix. Plants A and B processed ore using the dispersant procedure as illustrated in Example II. Plant C utilized an ore processing procedure as described in Example I. In each processing operation three sized fractions were obtained. The quantity of each mesh fraction recovered from the three operations are tabulated below as parts by weight.

| | Plant A | Plant B | Plant C |
|---|---|---|---|
| Feed | 60 | 30 | 180 |
| Minus ⅜" plus 14 mesh | 3 | 2 | 13 |
| Minus 14 mesh plus 200 mesh | 38 | 20 | 131 |
| Minus 200 mesh | 19 | 8 | 36 |

Phosphate pebble products (minus ⅜ inch, plus 14 mesh) from plants B and C were combined to produce 15 parts by weight of phosphate concentrate averaging 67 B. P. L. (bone phosphate of lime). Three parts by weight of pebble from plant A were ground to 50% minus 200 mesh and combined with 19 parts by weight of minus 200 mesh leached zone and 8 parts by weight of transition zone and used as feed for chemical processing to recover valuables, such as $P_2O_5$, $Al_2O_3$ and $U_3O_8$ therein contained. The minus 14 plus 200 mesh material from plant A, 38 parts by weight, was discarded since it showed less than 6% B. P. L. and was not suitable as flotation or spiral feed. The minus 14 mesh, plus 200 mesh material from plants B and C, 151 parts by weight, was combined and screened at about 35 mesh. Oversize was subjected to spiral treatment and undersize was subjected to flotation treatment for recovery of products analyzing 72% B. P. L. and 77% B. P. L., respectively.

Having thus described and illustrated the invention, what we claim is:

1. In the process of recovering mineral values in concentrated slurry form from leached zone material from the Florida pebble phosphate fields wherein said ore is pulped with water, the steps comprising slurrying the leached zone material, adding to the slurry a dispersant selected from the group of sodium silicate, sodium hexametaphosphate and mixtures thereof, classifying the dispersed slurry and recovering a minus 200 mesh size fraction having a solids content between about 25% and about 35% by weight.

2. In the process of recovering mineral values in concentrated slurry form from ores found in the Florida pebble phosphate fields wherein said ores are pulped with water, the steps comprising separately slurrying transition zone, leached zone and phosphate matrix material, adding to the transition zone and leached zone slurries a dispersant selected from the group consisting of sodium silicate, sodium hexametaphosphate and mixtures thereof, separately classifying the slurries, recovering from the transition zone material both a minus 200 mesh size fraction and a plus 200 mesh size fraction, recovering from leached zone material a minus 200 mesh size fraction comprising predominantly uranium, aluminum, and phosphate constituents, combining the minus 200 mesh size fractions, recovering from phosphate matrix a plus 200 mesh size fraction and combining the plus 200 mesh size fractions comprising predominantly phosphate rock values.

3. In the process of recovering mineral values in concentrated slurry form from ores found in the Florida pebble phosphate fields wherein said ores are pulped with water, the steps comprising separately slurrying transition zone, leached zone and phosphate matrix material, adding to the transition zone and leached zone slurries sodium silicate in quantities ranging between about 1 pound and about 30 pounds per ton of dry solids, separately classifying the slurries, recovering from the transition zone material both a minus 200 mesh size fraction and a plus 200 mesh size fraction, recovering from leached zone material a minus 200 mesh size fraciontion, combining the minus 200 mesh size fractions comprising predominantly uranium, aluminum, and phosphate constituents, recovering from phosphate matrix a plus 200 mesh size fraction and combining the plus 200 mesh size fractions comprising predominantly phosphate rock values for further processing.

4. In the process of recovering mineral values in concentrated slurry form from ores found in the Florida pebble phosphate fields wherein said ores are pulped with water, the steps comprising separately slurrying transition zone, leached zone and phosphate matrix, material, adding to the transition zone and leached zone slurries sodium hexametaphosphate in quantities ranging between about 0.5 pounds and about 9 pounds per ton of dry solids, separately classifying the slurries, recovering from the transition zone material both a minus 200 mesh size fraction and a plus 200 mesh size fraction, recovering from leached zone material a minus 200 mesh size fraction, combining the minus 200 mesh size fractions comprising predominantly uranium, aluminum, and phosphate constituents, recovering from phosphate matrix a plus 200 mesh size fraction and combining the plus 200 mesh size fractions comprising predominantly phosphate rock values for further processing.

References Cited in the file of this patent

UNITED STATES PATENTS

| | | |
|---|---|---|
| 2,381,514 | Phelps | Aug. 7, 1945 |
| 2,550,289 | Le Baron | May 1, 1951 |
| 2,660,303 | Haseman | Nov. 24, 1953 |
| 2,767,045 | McCullough | Oct. 16, 1956 |
| 2,769,686 | McCullough et al. | Nov. 6, 1956 |

OTHER REFERENCES

ORNL–1500, AEC Document, March 31, 1953, pp. 5, 24, 25.

UNITED STATES PATENT OFFICE

CERTIFICATE OF CORRECTION

Patent No. 2,868,618                                  January 13, 1959

Fred N. Oberg et al.

It is hereby certified that error appears in the printed specification of the above numbered patent requiring correction and that the said Letters Patent should read as corrected below.

Column 3, lines 12 and 13, strike out "from the hydroclassification of predominantly minus 200 mesh material." and insert instead -- the plus 200 mesh material will entrain with the minus 200 mesh material. --; column 7, lines 16 and 17, strike out "comprising predominantly uranium, aluminum, and phosphate constituents", and insert the same after "fractions," in line 18, same column.

Signed and sealed this 5th day of May 1959.

(SEAL)
Attest:

KARL H. AXLINE                                            ROBERT C. WATSON
Attesting Officer                                        Commissioner of Patents